United States Patent [19]

Harper

[11] Patent Number: 4,473,176

[45] Date of Patent: Sep. 25, 1984

[54] CHAIN SAW SECURITY MOUNTING DEVICE

[76] Inventor: Donald S. Harper, P.O. Box 252, Montague, Calif. 96064

[21] Appl. No.: 449,518

[22] Filed: Dec. 13, 1982

[51] Int. Cl.[3] .......... B60R 9/00; B65D 81/00; B65D 85/68

[52] U.S. Cl. .......... 224/42.45 R; 70/58; 70/61; 206/349; 211/4; 248/552

[58] Field of Search .......... 248/552, 551, 553; 211/4, 7, 8; 70/58, 61, 62; 224/42.45 R, 42.38; 206/349, 319, 591; 30/151, 153, 286, 382; 76/78 R, 78 A, 25 A, 36

[56] References Cited

U.S. PATENT DOCUMENTS

| | | | |
|---|---|---|---|
| 3,478,869 | 11/1969 | Walters | 206/319 |
| 3,534,638 | 10/1970 | Van Ourkerk | 76/25 A |
| 3,884,055 | 5/1975 | Vuillemot | 70/58 |
| 3,893,568 | 7/1975 | Lile | 224/42.45 R X |
| 4,109,900 | 8/1978 | Vandecoevering | 269/102 |
| 4,162,004 | 7/1979 | Thomas | 206/349 |
| 4,248,412 | 2/1981 | DeRoy | 76/36 X |
| 4,339,039 | 7/1982 | Mykleby | 206/591 X |
| 4,369,575 | 1/1983 | Schurman | 294/165 X |
| 4,371,079 | 2/1983 | Dembicks | 206/349 |

*Primary Examiner*—Allan N. Shoap
*Attorney, Agent, or Firm*—Neil J. Driscoll

[57] ABSTRACT

A security mounting device for a chain saw is disclosed which consists of a base plate carrying a downwardly directed channel spaced above and at one end of the base plate. The channel is adapted to receive and embrace the operator's handle of a chain saw. A pair of transversely spaced plates are carried at the other end of the base plate and project upwardly therefrom and are adapted to receive therebetween the chain bar of the saw. Holes are provided in the upper ends of the spaced plates which receive a demountable pin, said pin, when in place, being adapted to confine the chain bar within the transversely spaced plates. Resilient means such as rubber-like pads may be carried by the base plate and the channel to flexibly engage the saw motor housing and operator handle, respectively. The pin may be provided with a hole to receive a conventional pad lock to prevent removal of the saw from the device. Means may be provided on the base plate to secure the plate to a supporting structure such as the bed of a pickup truck.

5 Claims, 5 Drawing Figures

CHAIN SAW SECURITY MOUNTING DEVICE

BACKGROUND OF THE INVENTION

1. Field of the Invention

The invention pertains to a security mounting device for a chain saw and is particularly concerned with both the safe storage and the safe transport of the chain saw from one locale to another in the chain saw user's transporting vehicle.

2. Description of the Prior Art

Mounting devices for chain saws are generally known in the prior art. For example a chain saw vise is shown in U.S. Pat. No. 4,109,900 to Vandecoevering, dated Aug. 29, 1978. The vise disclosed is for the purpose of making field repairs on chain saws. The vise has two fixed jaws and an interposed movable jaw, and, wing bolts are provided to firmly clamp the bar of a chain saw. Protruding from the bottom side of the vise is a mounting spike which may be driven into a tree stump at the logging site, thus providing a firm base to effect chain saw repair.

Another chain saw work site support is disclosed in U.S. Pat. No. 4,248,412 dated Feb. 3, 1981 to DeRoy. This patent also discloses a chain saw support and includes a spike for attaching the support to a tree stump in the field and wing nut clamping means to lock the bar of the chain saw in place while effecting saw repair. Further, the structure includes a second member adapted to support the handle or safety guard of the saw. The saw is thus supported in an upside down position for easy tooth access.

It is thought apparent that nothing in the prior art in any way teaches or suggests the security mounting of a chain saw during vehicular transport to various work sites.

SUMMARY OF THE INVENTION

It is well known that portable chain saws are a highly used tool in the logging industry. They are in fact tree-felling machines. The loggers must be transported from their homes in populated areas to various work sites usually in remote forest. The most frequent transport vehicle used is the pickup truck, the loggers carrying their chain saws in the open box of the truck. Truck movement, especially over rough terrain for quite long distances subjects the saw to considerable violent movement which can induce saw damage. Additionally, the chain saw in the open truck box may be easily stolen when the truck is temporarily parked in populated areas.

Accordingly, it is a primary object of the present invention to provide a chain saw mounting device that will firmly and securely hold the chain saw while it is being transported in the logger's vehicle.

It is a further object of the present invention to provide a chain saw mounting device that is adapted to provide the logger with means to lock the saw in place in his vehicle and thereby prevent theft of the saw in the event the vehicle is left unattended.

It is yet another object of the invention to provide a chain saw mounting device structurally arranged to prevent the disassembly of the chain saw bar from the saw body and thus prevent theft of the saw through this act.

It is yet a further object of the invention to provide a chain saw mounting device including resilient means to hold the saw captive in the mounting device.

It is still another object of the invention to provide a security chain saw mounting device of the type described formed and arranged to accomplish quick and efficient mounting and demounting of the saw to and from the device.

These and other objects and advantages of the invention will be apparent to persons skilled in the logging art from an examination and review of the following specification and the related drawings.

DETAILED DESCRIPTION OF A TYPICAL PREFERRED EMBODIMENT

Figure 1:
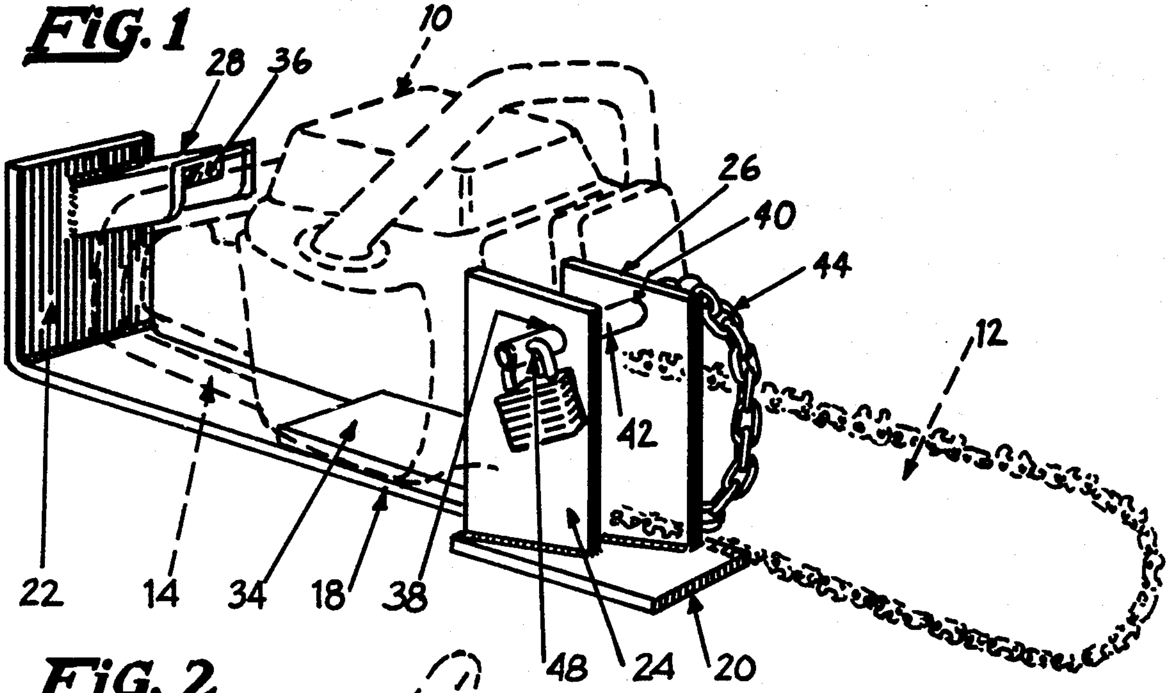
FIG. 1 is a perspective view of the invention showing a chain saw in dashed outline held by the device.
Figure 2:
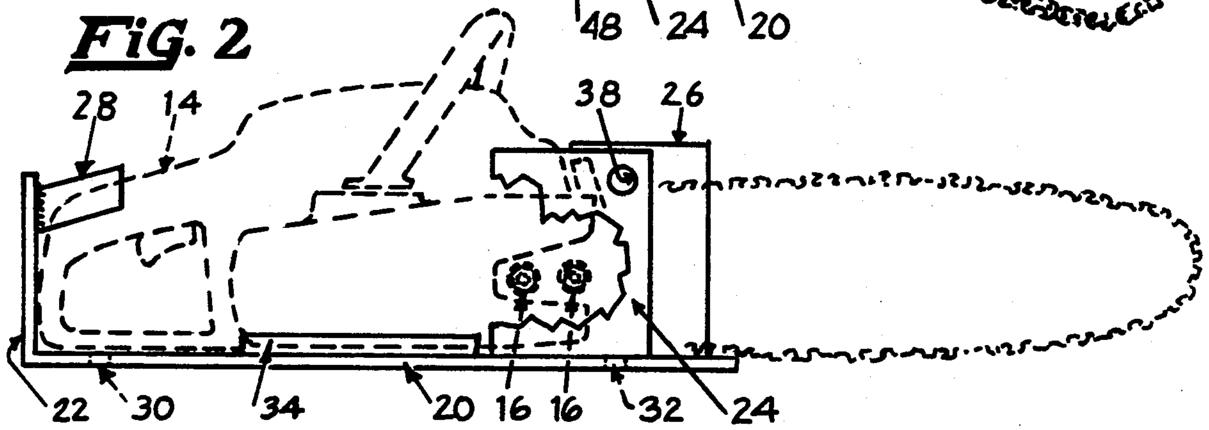
FIG. 2 is a side elevational view of the invention showing a chain saw in dashed outline held by the device and with a section of one of the guide bar embracing plates broken away to illustrate how the plate protects and shields the guide bar mounting bolts and nuts.
Figure 3:
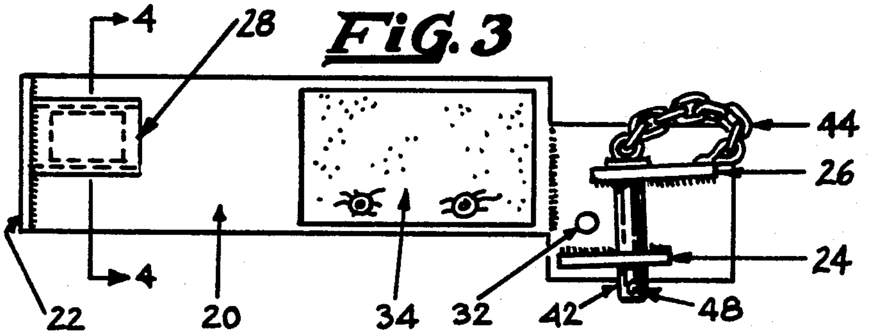
FIG. 3 is a plan view of the mounting device of FIGS. 1 and 2.
Figure 4:
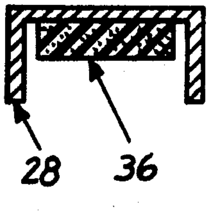
FIG. 4 is a sectional view taken along line 4—4 of FIG. 3 and through handle embracing channel of the device.

In FIG. 1 and FIG. 2 a typical chain saw is shown in dashed lines and comprises a motor housing 10 and a chain guide bar 12 projecting forwardly therefrom. An operator's handle 14 is secured to the housing 10 and projects rearwardly therefrom. Typically one or more bolt-nut combinations 16, 16 (FIG. 2) secure the guide bar 12 to the housing 10.

The security mounting device is indicated generally at 18 and comprises a base plate 20 having an upwardly projecting wall 22, at its rear aspect, and two transversly spaced guide plates 24 and 26 at its forward aspect. A downwardy facing channel 28 is secured to the upper end of wall 22 and is angled upwardly in relation to the horizontal at the approximate angle of inclination of the handle 14 of the saw when the saw is at a rest condition. Holes may be provided in base plate 20 at its rear aspect below the channel 28, as at 30, and at the forward aspect of plate 20 intermediate the guide plates 24 and 26, as at 32. The holes 30 and 32 may be used to bolt the mounting device to the bed of a carrying vehicle such as the floor of the open box of a pickup truck. With the mounting holes so located the mounting bolts are shielded by the chain saw when it is in position on the device (FIG. 1) and the mounting device may not be removed from the vehicle. While other modes of securing the mounting device to the carrying vehicle may be used, the described arrangement has the advantage of allowing the logger to transfer the security mounting device to different vehicles.

The base plate 20 is provided with a resilient means, i.e., rubber pad 34 on its upper surface and rearwardly of the guide plates 24 and 26. In addition resilient means, such as rubber pad 36, is placed in the channel 28 and faces downwardly toward the plate 20. A pair of pin receiving holes 38 and 40 are placed in the upper aspects of guide plates 24 and 26 and are adapted to receive pin 42 which is movably secured to the device by chain 44.

To use the security mounting device it will be understood that the pad 34 is adapted to engage and support the lower surface of motor housing 10 and that the channel 28 is adapted to receive and embrace the upper surface of operator's handle 14. The saw operator merely places the handle 14 within the channel 28 and then rests the housing on the pad 34. The handle 14, of course, engages the pad 36 within channel 28. The operator then grasps the upper edge of bar 12 and forces it downwardly slightly compressing the pads 34 and 36. He forces the bar down until its upper edge is below the aligned holes 38 and 40. The bar, of course is positioned intermediate the plates 24 and 26. The operator then deposits the pin 42 within holes 38 and 40, relaxing the pressure on bar 12 allowing the pads 34 and 36 to gently flex the upper edge of bar 12 into engagement with pin 42. It will now be apparent that the chain saw is securely mounted to the device 18. Note that the pin 42 is provided with an enlarged head 46, at one end it may also be provided with a hole 48 at the other end. The hole 48 is adapted to recieve a conventional padlock.

It will be apparent to all loggers that the device is effective to firmly and securely hold a captured chain saw and prevent damage thereto even though the transporting vehicle is driven over the roughest terrain.

It will further be noted that with the chain saw in place on the device, access to the mounting holes 30 and 32 is prevented so the entire device may not be removed from the vehicle when it is left unattended.

Also with the pin 42 in position and using a conventional padlock, the pin and consequently the saw may not be removed from the mounting device and providing further theft protection.

And lastly, with the guide plates properly positioned, access to the guide bar mounting bolt-nut combinations 16, 16 is prevented which effectively avoids theft of the saw via guide bar disassembly.

Figure 5:
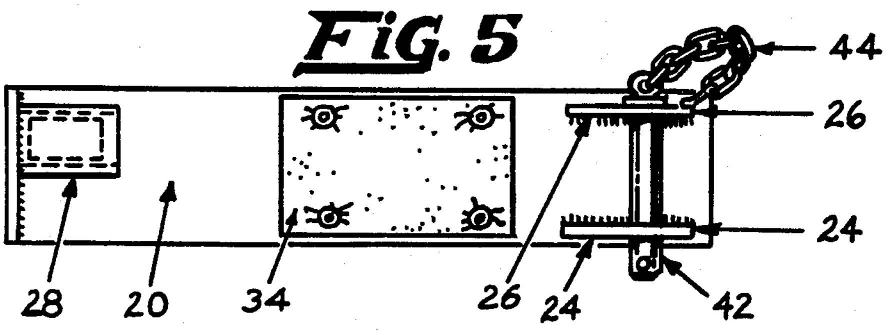
FIG. 5 is a plan view of a slightly modified mounting device illustrating how the guide bar embracing plates may be variously positioned relative to each other and longitudinally of the device to accomodate chain saws of various configurations.

It will be understood the housing configurations of various models and brands of chain saws varies so that the relative positions of the saw teeth dogs and the bar mounting bolt-nut combinations 16, 16 may be slightly different in various models and brands. Consequently, the height and angle of the channel 28 and the relative locations of the guide plates 24 and 26 to each other may have to be slightly varied. A variation of this type is shown in the plan view of FIG. 5. Nevertheless, the embodiment of FIG. 5 has all of the operative components of the prior preferred embodiment. That is, the teaching of FIG. 5 involves a base plate, handle receiving channel, guide plates to receive and embrace the saw bar, locking pin and padlock structure and the resilient pads operatively positioned on the base plate and in the channel. Accordingly, the numerals used in FIG. 5 are identical as in the embodiment of FIGS. 1 to 4 where identical functioning structure is shown.

It will also be apparent from a review of the above specific description that a plurality of mounting devices may be physically connected and aggregated horizontally, vertically or both horizontally and vertically thus providing a mode for mounting a plurality of chain saw units. This would prove desirable where a crew of loggers are using a single vehicle for transport to the work site.

The invention as shown and described is for illustration only of a presently preferred embodiment. The disclosure may therefore be subject to modification all within the spirit and scope of the appended claims.

What is claimed is:

1. In a security mounting device for a chain saw, said chain saw comprising a motor housing, an operator handle connected to and projecting rearwardly from the motor housing, a chain guide bar projecting forwardly from the motor housing, bolt and nut means on the side of the housing and adapted to connect the chain bar to the housing, the combination of a support member, connection means associated with the support member and adapted to connect the member to a supporting structure, an upwardly projecting element at one end of the support member, p1 channel means carried by the element in spaced relation to the support member and arranged to receive and embrace the operator handle, a pair of guide plates at the other end of the support member and projecting upwardly therefrom and arranged to receive the chain bar therebetween, pin means demountably arranged on the upper ends of the guide plates and adapted to engage the upper edge of the chain bar thereby confine the bar between the guide plates.

2. A security mounting device for a chain saw according to claim 1; wherein one of the said plates is carried by the support member immediately adjacent the bolt and nut means preventing access to said bolt and nut means and thereby preventing disconnection of the chain bar from the motor housing when the saw is mounted in the device.

3. A security mounting device for a chain saw according to claim 2; and including resilient means carried by the support member and adapted to flexibly engage the lower surface of the motor housing to bias the chain saw upwardly and bring the operator handle and the chain bar in to firm engagement with the channel means and pin means, respectively.

4. A security mounting device for a chain saw according to claim 3; and including, other resilient means within the channel means to flexibly engage the embraced operator handle.

5. A security mounting device for a chain saw according to claim 1, wherein the supporting structure is the bed of a pickup truck.

* * * * *